(12) United States Patent
Cartwright

(10) Patent No.: US 8,033,924 B2
(45) Date of Patent: Oct. 11, 2011

(54) GAME TABLE ASSEMBLY

(76) Inventor: Thomas Cartwright, Stuart, FL (US)

( * ) Notice: Subject to any disclaimer, the term of this patent is extended or adjusted under 35 U.S.C. 154(b) by 16 days.

(21) Appl. No.: 12/418,549

(22) Filed: Apr. 3, 2009

(65) Prior Publication Data

US 2009/0270191 A1 Oct. 29, 2009

Related U.S. Application Data

(63) Continuation-in-part of application No. 11/771,353, filed on Jun. 29, 2007, now Pat. No. 7,654,911, and a continuation-in-part of application No. 11/747,455, filed on May 11, 2007.

(60) Provisional application No. 60/800,223, filed on May 12, 2006, provisional application No. 60/882,688, filed on Dec. 29, 2006, provisional application No. 60/817,292, filed on Jun. 29, 2006, provisional application No. 61/042,163, filed on Apr. 3, 2008.

(51) Int. Cl.
*A63D 13/00* (2006.01)
*A63D 15/00* (2006.01)
*A63D 15/06* (2006.01)

(52) U.S. Cl. ................ 473/33; 473/29; 473/31

(58) Field of Classification Search .......... 473/33, 473/31, 1, 4, 11, 14
See application file for complete search history.

(56) References Cited

U.S. PATENT DOCUMENTS

| | | | | |
|---|---|---|---|---|
| 133,365 A | * | 11/1872 | Griffith | 473/33 |
| 142,202 A | * | 8/1873 | Braun | 473/33 |
| 170,059 A | * | 11/1875 | Collender | 473/33 |
| 175,666 A | * | 4/1876 | Collender | 473/33 |
| 214,368 A | * | 4/1879 | Collender | 473/33 |
| 280,198 A | * | 6/1883 | Ludwig | 473/33 |
| 305,463 A | * | 9/1884 | Morse | 473/8 |
| 498,049 A | * | 5/1893 | Cunningham | 473/33 |
| 606,196 A | * | 6/1898 | Dockstader | 473/33 |
| 6,641,486 B2 | * | 11/2003 | Shih | 473/33 |

* cited by examiner

*Primary Examiner* — Mitra Aryanpour
(74) *Attorney, Agent, or Firm* — The Smiley IP Law Group, PA; Scott D. Smiley

(57) ABSTRACT

The invention comprises, in one form thereof, a number of improvements to the assembly and installation of a game tables, such as a pool table. Particularly, the improvements include an indexing system for assisting in the placement of the slate segments on a table frame; for assisting in the placement of a synthetic table bed on a table frame; a magnetic interlock system for sealing the seams of table leaves; an interlocking interface for accurately assembling the slate segments of the playing surface; a pocket and rail assembly system for easily assembling the pockets to the rails; a leg leveling system; a systems for attaching the rail cloth to the rails, and an engineered box beam table frame.

7 Claims, 13 Drawing Sheets

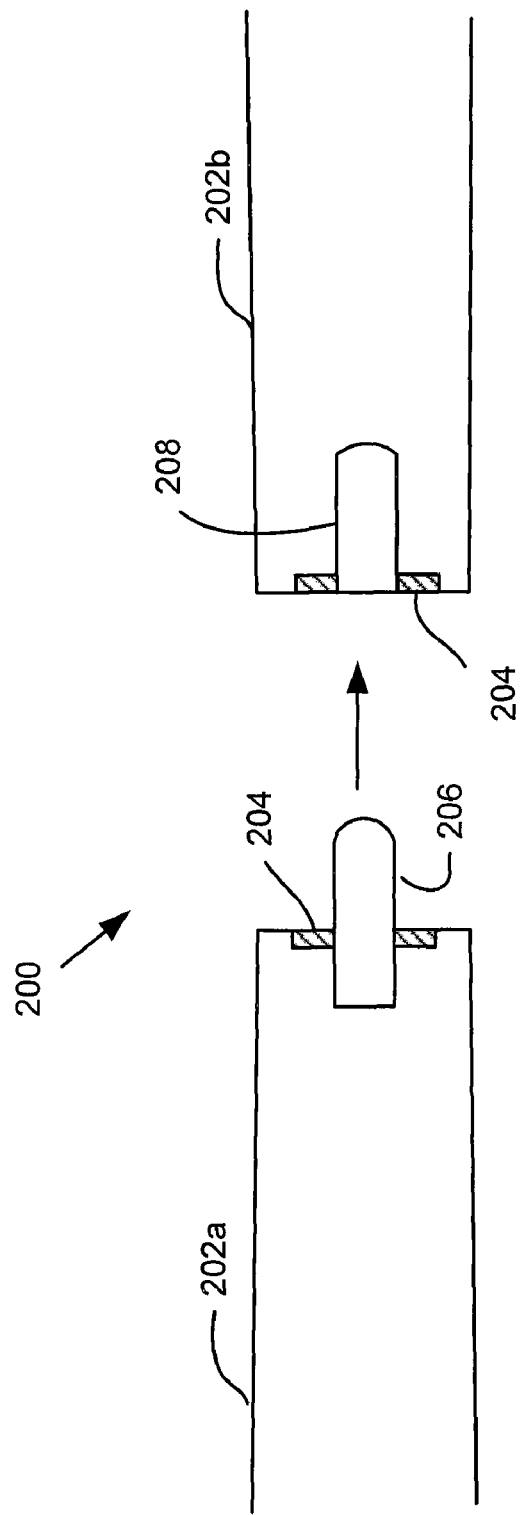

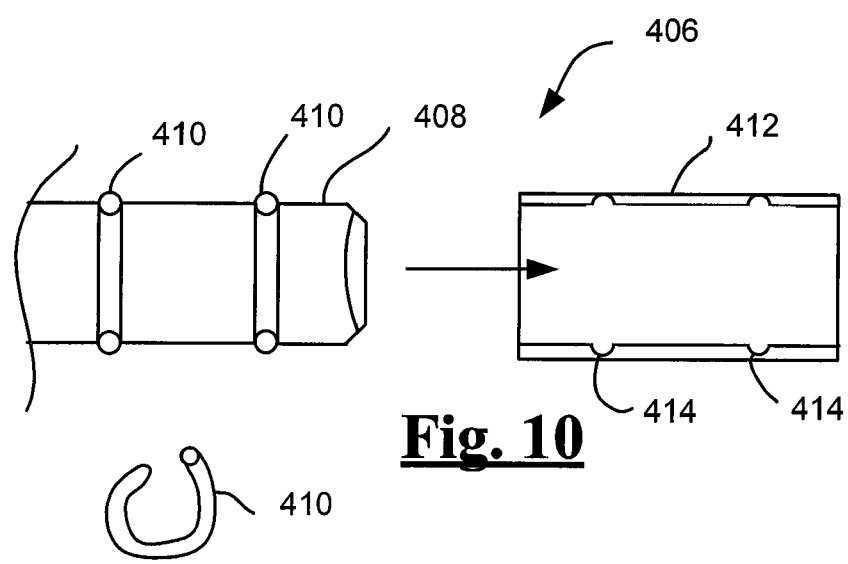
Fig. 10
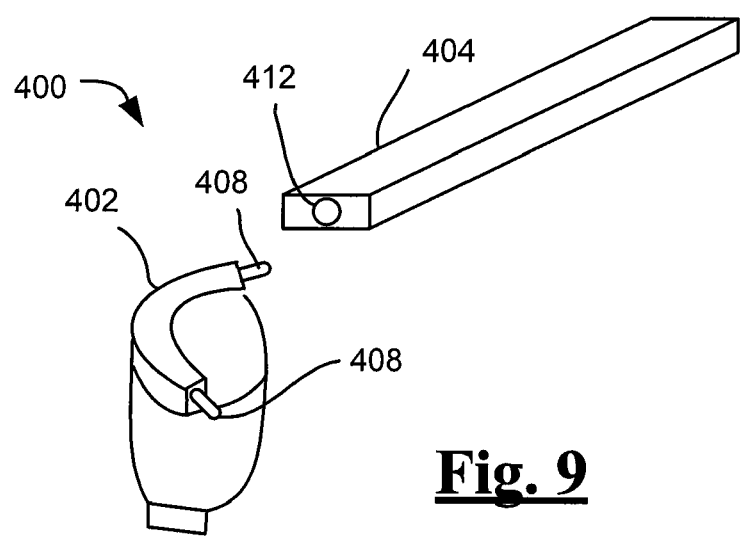
Fig. 10A
Fig. 9

US 8,033,924 B2

GAME TABLE ASSEMBLY

CROSS REFERENCE TO RELATED APPLICATIONS

This application is a continuation-in-part of prior application Ser. No. 11/747,455, filed May 11, 2007, which claims the benefit of provisional Application No. 60/800,223, filed May 12, 2006, and provisional Application No. 60/882,688, filed Dec. 29, 2006. This application is also a continuation-in-part of prior application Ser. No. 11/771,353 filed Jun. 29, 2007, now U.S. Pat. No. 7,654,911, which claims the benefit of provisional Application No. 60/817,292, filed Jun. 29, 2006. This application claims the benefit of provisional Application No. 61/042,163, filed Apr. 3, 2008. All of these applications are hereby incorporated by reference in their entirety.

FIELD OF THE INVENTION

This invention relates to game tables, such as billiard tables, and particularly to apparatus and methods for the assembly of the tables.

SUMMARY OF THE INVENTION

The invention comprises, in one form thereof, a number of improvements to the assembly and installation of a game table, such as a pool table. Particularly, the improvements include an indexing system for assisting in the placement of the state segments on a table frame; for assisting in the placement of a synthetic table bed on a table frame; a magnetic interlock system for sealing the seams of table leaves; an interlocking interface for accurately assembling the slate segments of the playing surface; a pocket and rail assembly system for easily assembling the pockets to the rails; a leg leveling system; a systems for attaching the rail cloth to the rails, and an engineered box beam table frame.

BRIEF DESCRIPTION OF THE DRAWINGS

The present invention is disclosed with reference to the accompanying drawings, wherein:

FIG. 8 is a cross-sectional view of the table leaves and magnetic seal of FIG. 3;

FIG. 9 is an isometric view of a billiard table rail and pocket assembly according to an embodiment of the present invention;

FIG. 10 is a cross-sectional view of the pocket extension and rail insert of FIG. 8;

FIG. 10A is an isometric view of a friction ring of FIG. 9;

Corresponding reference characters indicate corresponding parts throughout the several views. The examples set out herein illustrate several embodiments of the invention but should not be construed as limiting the scope of the invention in any manner.

DETAILED DESCRIPTION

Conventionally, the positioning of the surface materials onto the top of a table frame/base (primary slate section onto the table frame/base) required a measuring device to make multiple measurements and take considerable time and movement, to position the top evenly around the perimeter of the table.

In the case of a game table, such as a pool table, the positioning is of utmost importance as the table top surface has a machined and patterned hole and cut out configuration that needs to be precisely located to play the game. This need for accuracy and attention to positioning is tedious and awkward for the installation.

Figure 1:
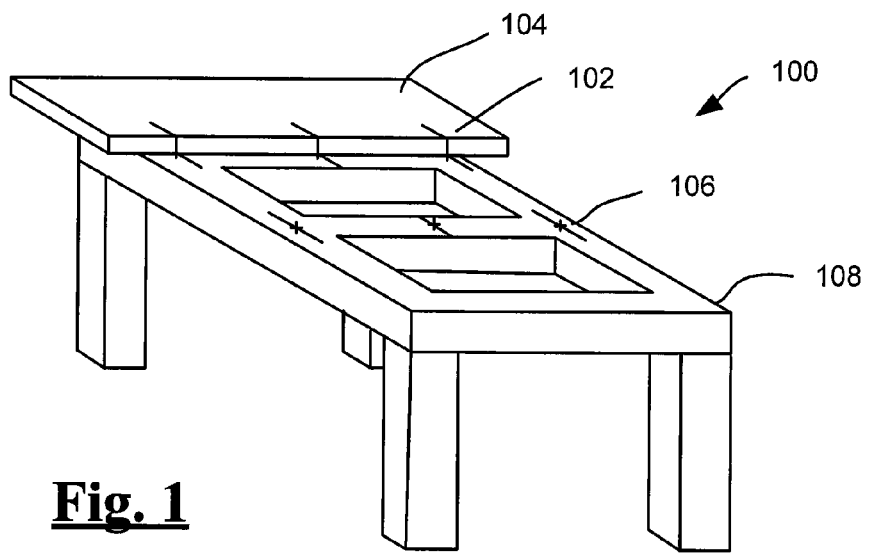
FIG. 1 is an isometric view of a game table frame and a portion of the game table surface material placed on the frame according an embodiment of the present invention.
Figure 2:
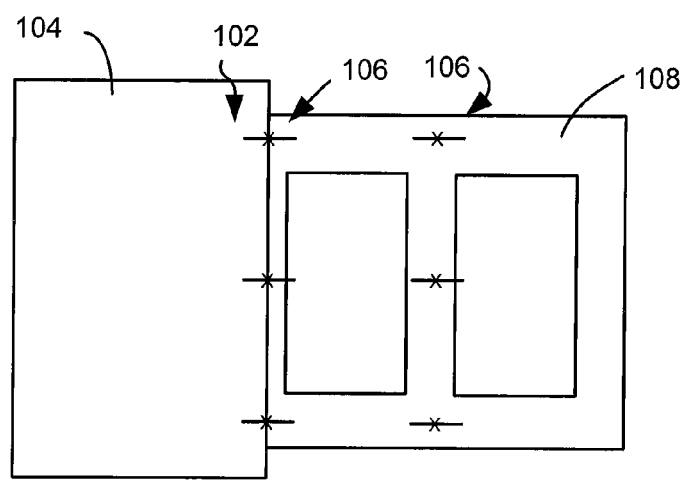
FIG. 2 is a top view of the game table frame and surface material of FIG. 1.

One embodiment of the present invention, as shown in FIGS. 1 and 2, provides an indexing system 100 that has marks 102 on the table top segments 104 and marks 106 on the table frame/base 108. The marks 102 and 106 are obvious, well marked and positioned in such a manner that when these indexing marks are lined up, the table top segments 104 and the table frame 106 will always be located in the correct position without the use of any measuring devices or having to make multiple adjustments to end caps in the correct positions. In the illustrated embodiment, the marks 102 and 106 are in the form of an arrow with the arrowhead terminating at the point where each mark 102 is to meet with a mark 106. The marks 102 on the table top segments 104 may include a line extending across the edge of the segment from the arrowhead to the back of the segment to aid in aligning the mark 102 with the mark 106. At least two pairs of marks 102/106 are used to ensure proper alignment of the segments 104 with the frame 108.

In the case that the table top comprises several segments (as illustrated in FIGS. 1 and 2, though only one segment is shown), the marks 106 on the frame 108 comprise two opposing arrows such that the segments 104 may be placed from either side. It should be noted that the indexing system simplifies the placement of even table tops having multiple segments.

The indexing system 100 may also utilize stop blocks or pins on the table top surface to act as guides for the top material to engage. The table top segments 104 may include machined detents or blind bores to capture the blocks or pins. Several blocks or pins may be used on multiple sides of the segments 104 to assure correct positioning in all directions.

The system 100 allows the assembly of the table to proceed in a more smooth, accurate, and timely manner, thus assuring the end user of higher quality and possible lower cost, by reducing the time for labor.

Figure 3:
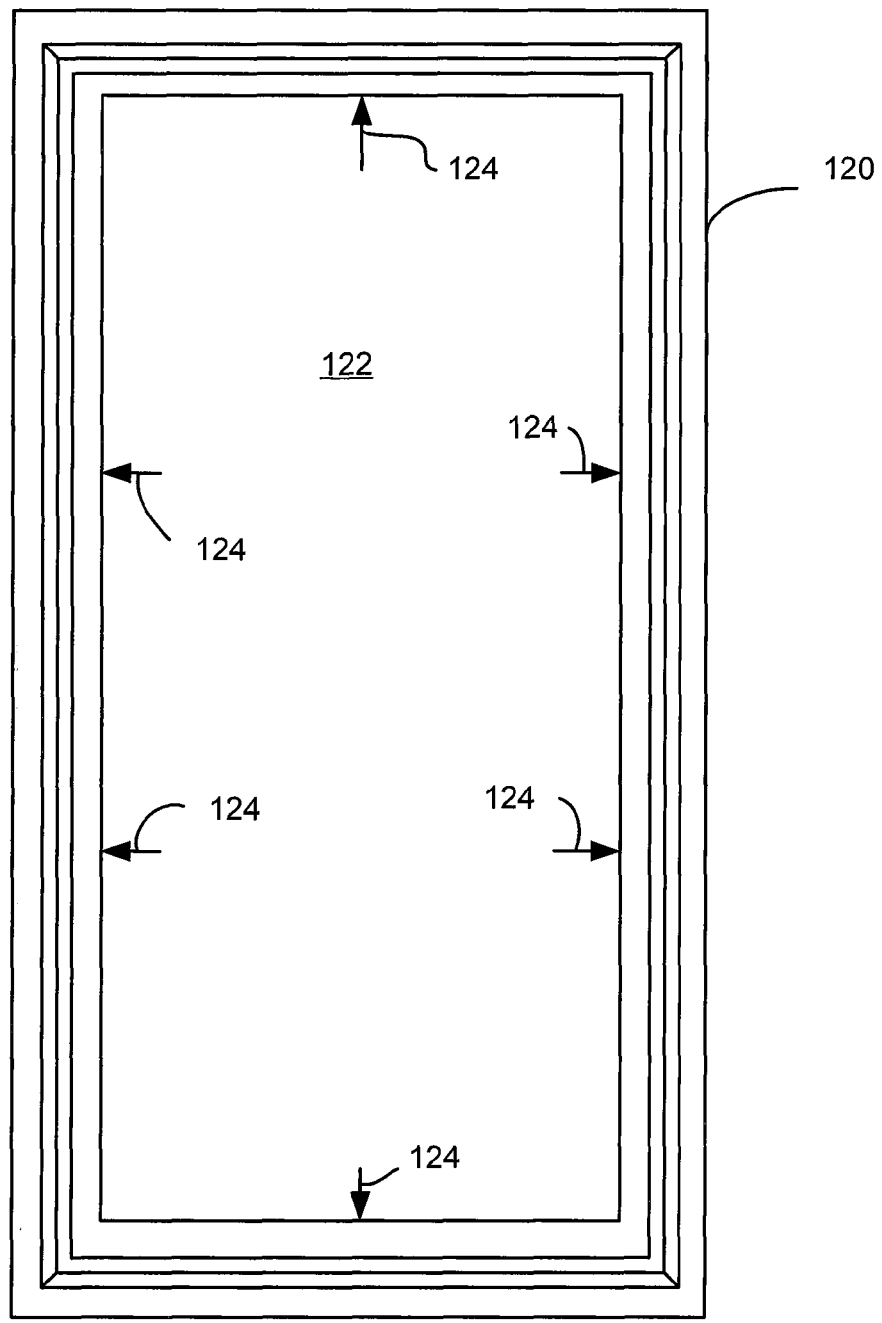
FIG. 3 is a bottom view of an alternative game table frame and an alternative surface material.
Figure 20:
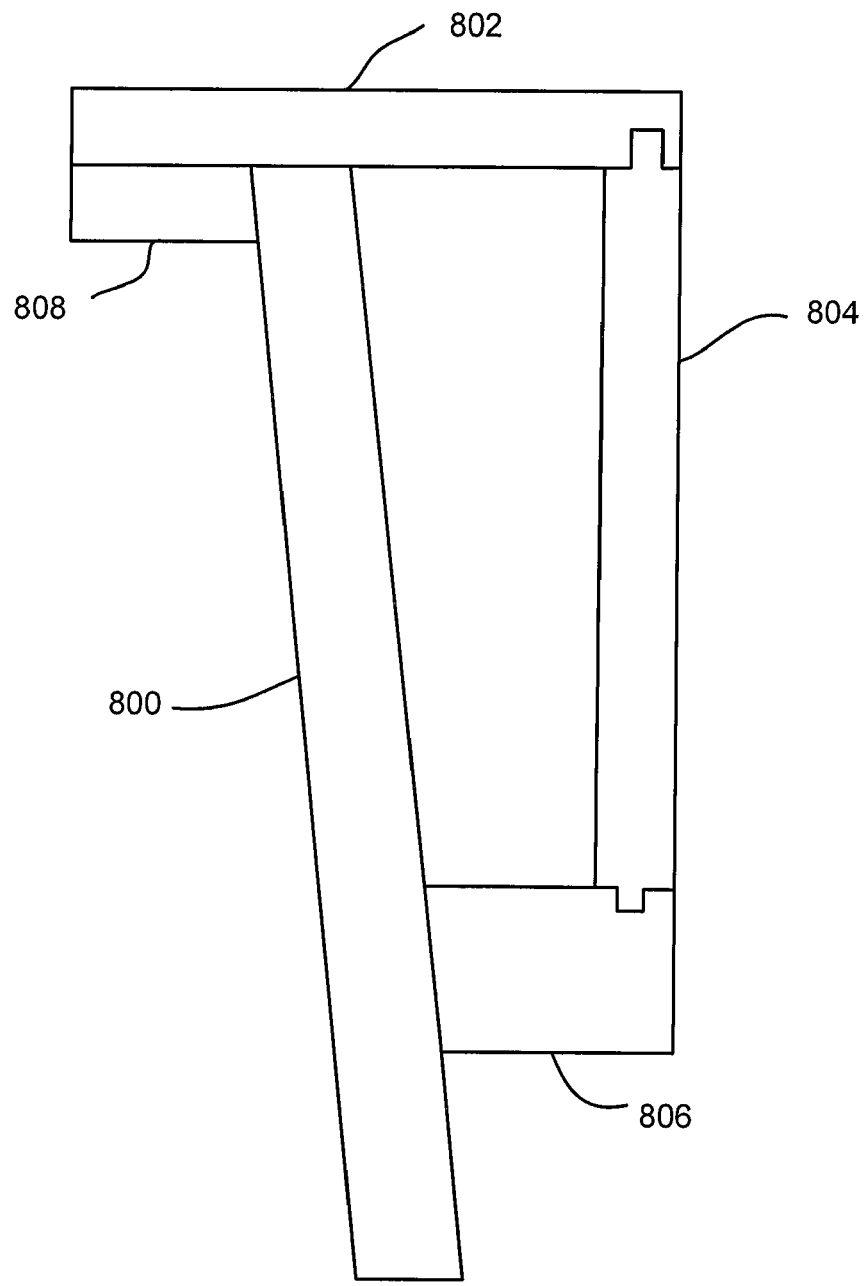
FIG. 20 is a cross sectional view of a side panel with supporting infrastructure.

FIG. 3 is a bottom view of an alternative game table frame 120, a cross section of which is shown in FIG. 20, and an alternative surface material 122. The alternative surface material may be a synthetic material such as a molded polymer with fibers embedded in the polymer. Such a table bed may be light enough to be attached to the table frame in one piece. Arrows 124 may be printed or embossed on the bottom of the synthetic bed for aligning the bed with the table frame 120.

Pool table or billiard table slate beds are conventionally made of heavy materials such as natural slate or other stone. Due to the weight factor, the large piece required for a full bed, which ranges from 6' to 10' in length, is cut down into multiple segments, such as two or three. The segments of slate are joined together end to end when assembling the table. Keeping the sections level and on a single planer surface is typically achieved by using various leveling devices such as wooden wedges or different types of shims that are adjusted and held in place by a mechanical fastener (i.e., screws or bolts). The seams at the slate joints are preferably flush to create a smooth, uninterrupted surface under the cloth covering for the ball to roll smoothly across the table from section to section.

Figure 4:
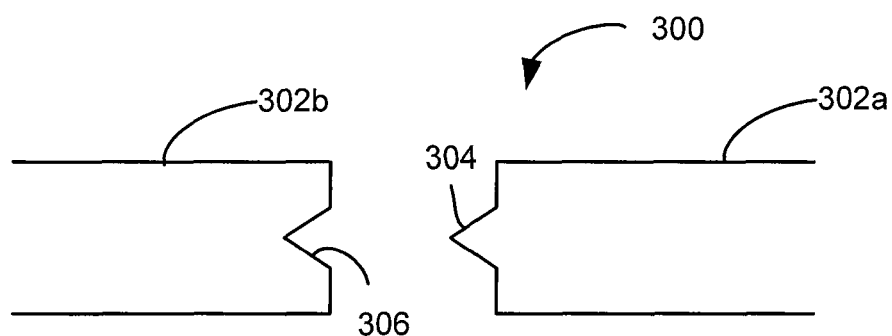
FIGS. 4, 5, and 6 are cross-sectional views of alternative table segment interfaces according to an embodiment of the present invention.
Figure 5:
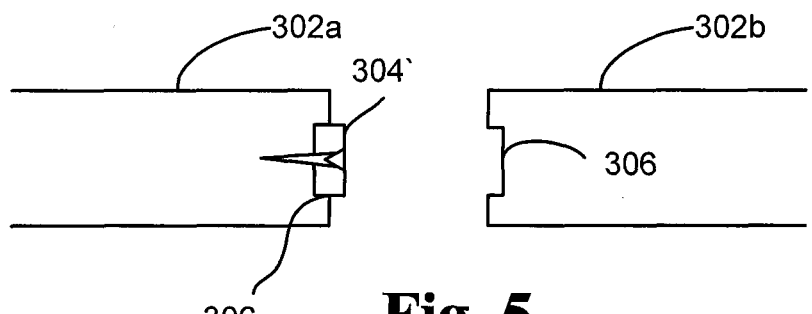

Thus, an embodiment of the present invention further includes an interlocking interface 300 between two slate segments 302a and 302b that align the sections such that the segments are positioned into a preset relationship that is continuous and smooth along the top surface of the joint or seam. This interface 300 includes a protrusion 304 machined into the edge of the segment 302a and a complementary recess 306 machined into the adjoining edge of segment 302b. An example of the interface 300 is shown in FIG. 4 with the protrusion 304 and the recess 306 having a triangular profile. An alternative embodiment is shown in FIG. 5 wherein both segments 302a and 302b include recesses 306, and segment 302a further includes an insert 304' fastened within its recess 306. while the interface 300 is only shown in profile in FIGS. 5 and 6, the protrusions 304 and recesses 306 may extend the length of the edges of the segments for vertical alignment of the segments, or the protrusions 304 and recesses 306 may include several discrete sections spaced apart along the edges for vertical and horizontal alignment of the segments 302a and 302b.

Figure 6:
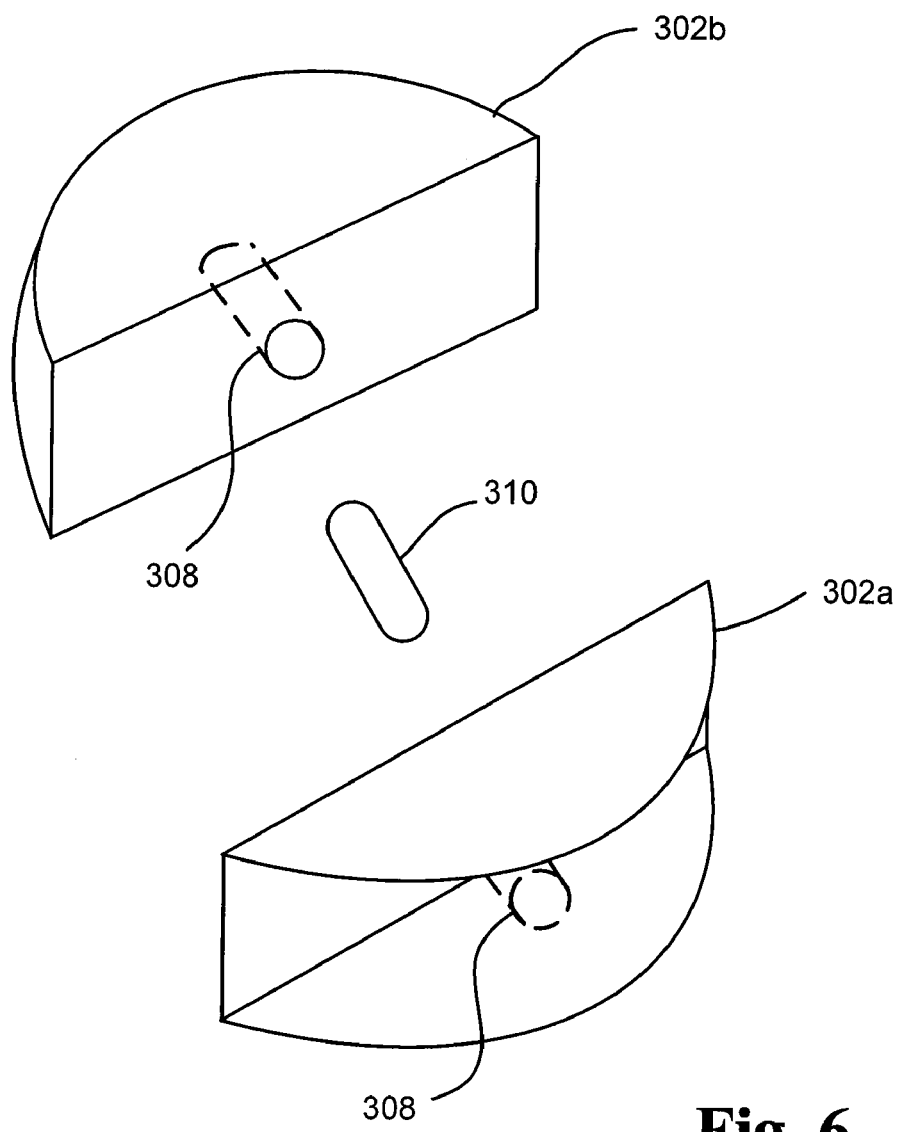

In an alternative embodiment shown in FIG. 6, the segments 302a and 302b include aligned blind bores 308. A dowel 310 is inserted into the bores 308 to align and secure the segments.

The segments 302a and 302b are pre-aligned at the time of manufacturing these slate sections to ensure the proper alignment of the interface portions. The interlocking interface 300 may also be used to hold the two pieces in an aligned relationship, such that the surface grinding of both, or multiple pieces, can be done to bring any variations in the surfaces to a singular planer surface. Once the segments 302a and 302b are separated, they can be rejoined and with the interlocking interface 300 the singular planer surface is again recreated without need to adjust the individual pieces.

These interlocking interfaces can be formed in molded synthetic table beds as well as slate. The molded synthetic table bed can have recess for receiving attachment hardware used to secure the table bed to the table frame.

Figure 7:
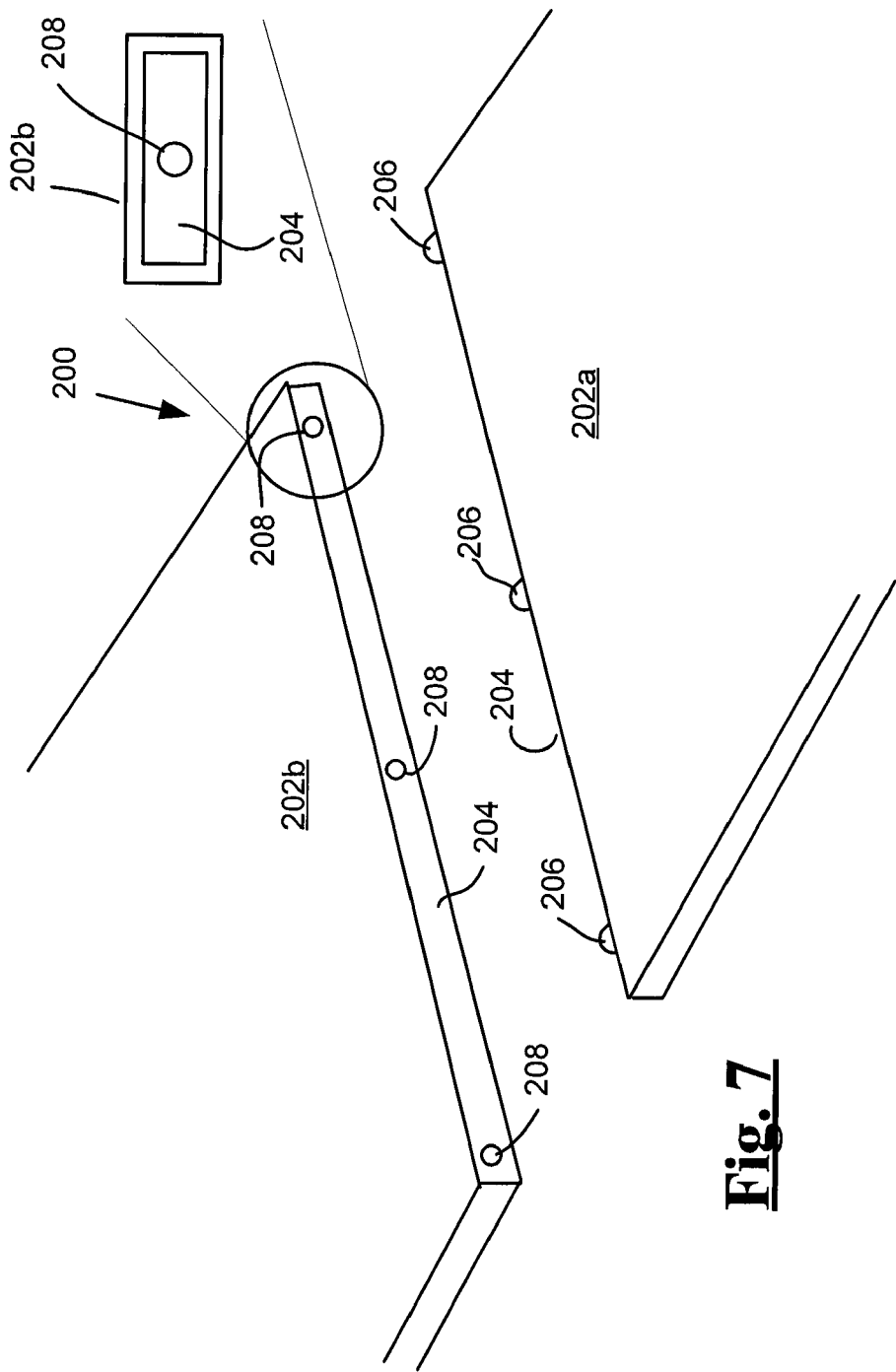
FIG. 7 is an isometric view of two portions of a table surface material, or table leaves, with a magnetic seal.

A pool table can be used for other purposes if a flat surface is place across the top of the pool table. Because of the size of the pool table, such a flat surface is easier to handle if it is formed of sections or leaves that are joined on top of the pool table. It is typically difficult to ensure a smooth, tight connection between table leaves and other table top segments even with an indexing system. In a particular embodiment of the invention shown in FIGS. 7 and 8, the table leaves 202a and 202b include a magnetic closure system 200 which may be in the form, or similar to, refrigerator door sealing magnetic strips. The table leaves 202a and 202b may be, in particular, table leaves placed over the bed of a pool table or other game table to protect the game surface from spills. The slate pieces for the bed of a pool table may also include the magnetic closure system 200, such as in combination with the indexing system 100 to ensure the segments are aligned properly and have a smooth, tight seal. Each segment 202a and 202b has a magnetic strip 204 on the inner face and, when pushed together, the magnetic strips 204 lock up to provide a substantially liquid drip proof seal against spills on the table. It is preferred that the magnetic strips 204 are recessed into the inner faces of the leaves such that the top surfaces of the leaves meet to form a smooth connection without a gap. The table leaf 202a may include a plurality of protrusions 206, such as dowels, corresponding to a plurality of blind bores 208 (FIG. 7) in the table leaf 202b. The dowels 206 engage the bores 208 to ensure proper alignment of the leaves and to resist shear movement of the leaves relative to one another.

The pockets on a game table, such as a pool table, are typically attached and secured to the rails by turning all the rails upside down so that the pockets can be bolted to the bottom of the rail. Once all pockets have been secured to the rails, the whole pocket and rail unit (usually no smaller than 4'×8') is picked up, turned over, and secured to the table. This is usually a two-person task.

One or more embodiments of the present invention provide an improved system that allows the user to leave the rails right-side up in the playing position on the table while securing the pockets to the rails. There is no need for lifting or being put in an awkward position to move and flip over the a pocket and rail assembly as is done in the prior art.

Accordingly, an embodiment of the present invention includes a pocket and rail assembly 400 shown in FIGS. 9, 10, and 10A. The pockets 402 are secured to the rail 404 using a friction coupler 406. An example of such a coupler is shown in the figures; however, there are many variations of friction method, and these are considered within the scope of the invention.

The friction coupler 406 includes a pocket extension 408 with one or more friction rings 410 and a rail insert 412. The rail insert 412 may be formed in the end of the rails during manufacturing, or they may comprise an insert that may be affixed to a blind bore in the end of the rail by press-fitting or adhesive. The rail insert 412 defines a groove for each friction ring 410 configured so that each friction ring 410 engages a groove 414 when the pocket extension 408 is fully inserted into the rail insert 412. Each pocket 402 is attached to the end of two rails 404 by friction couplers. One or more friction couplers may be used between each rail and pocket for a secure connection. While FIG. 8 shows a corner pocket, side pockets may utilized the pocket and rail assembly 400 as well.

Thus the pocket and rail assembly 400 allows the user to assemble the pockets to the rails with the rails on the table and without requiring the user to manipulate an unwieldy pocket and rail unit. Thus assembly time is reduced and fewer people are required to assemble the pockets to the rails.

Due to variations in floor surfaces, many tables require leveling to bring the table top into a level planer position. In particular, a heavy table such as a slate pool table, not only needs a level top to function properly, but requires substantial effort to raise the table's weight to adjust the height. Typically, tables are leveled manually from under the table.

Figure 11:
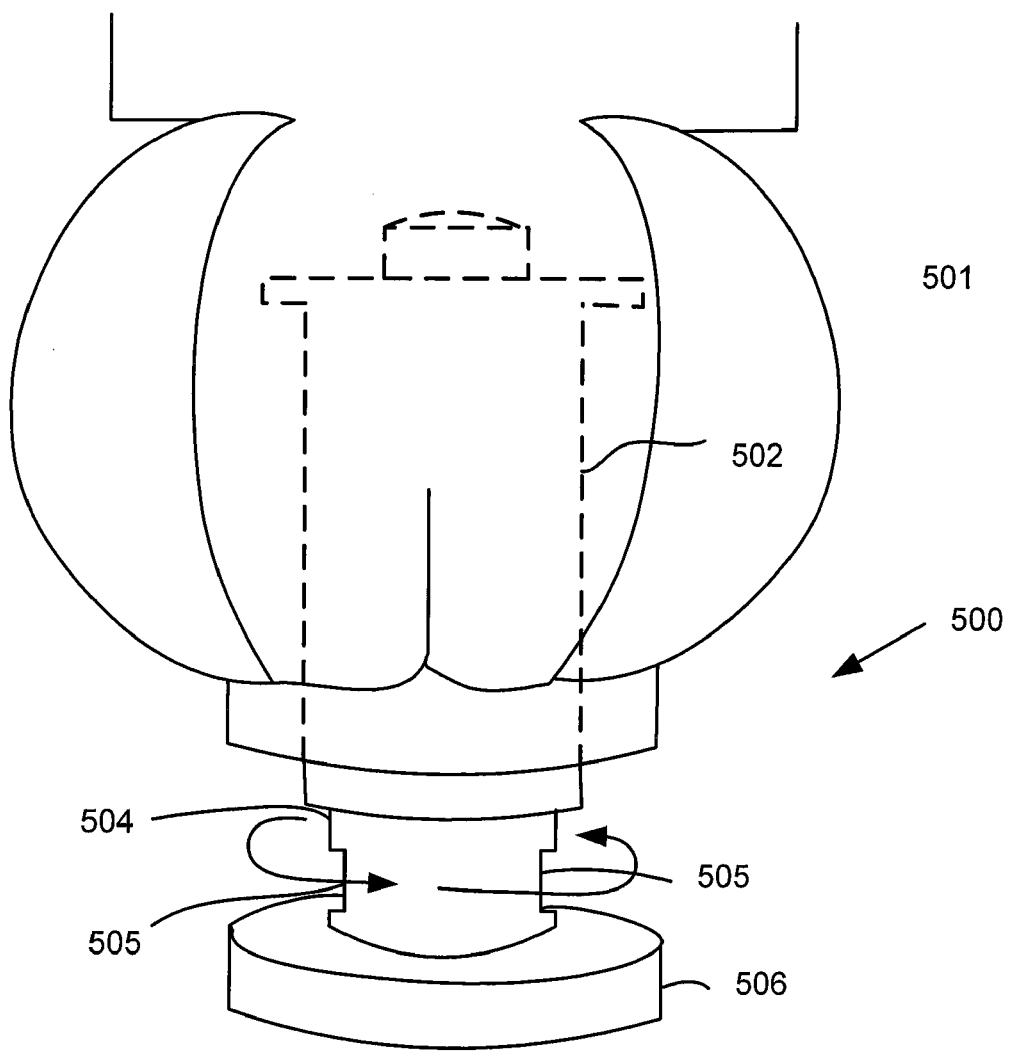
FIGS. 11 and 12 are isometric views of a table leg leveling apparatus according to an embodiment of the present invention.

An embodiment of the present invention includes a leg leveling system 500 easily accessible on the outside of the table (not requiring one to go under the table for adjustments). The system also allows the user to adjust the leg height without directly lifting the table weight. Another pool table leveling system is described in co-pending U.S. patent application Ser. No. 11/771,353, filed Jun. 29, 2007, the disclosure of which is herein incorporated by reference. In one embodiment of the present invention, the table weight is raised and lowered by the screw action of the table leveling device 500. The device, shown in FIGS. 11-13, includes a leg insert 502, a screw 504, and a foot pad 506. The leg insert 502 is inserted into a bore in the base of a leg 501 and affixed thereto. The leg insert 502 includes internal threads that engage complementary external threads on the screw 504. Detents 505 on the external portion of the screw 504 are included for cooperating with a tool 508, such as a wrench. Conventional foot pads rotate with the leveler and may damage a floor surface. However, the screw 504 engages the foot pad 506 via a bushing or a thrust bearing such that the screw 504 may rotate relative to the foot pad 506. This allows the user to level the table without scratching the floor, and the reduced friction between the screw and the foot pad relative to a foot pad and a floor allows the user to make adjustments more easily.

Figure 12:
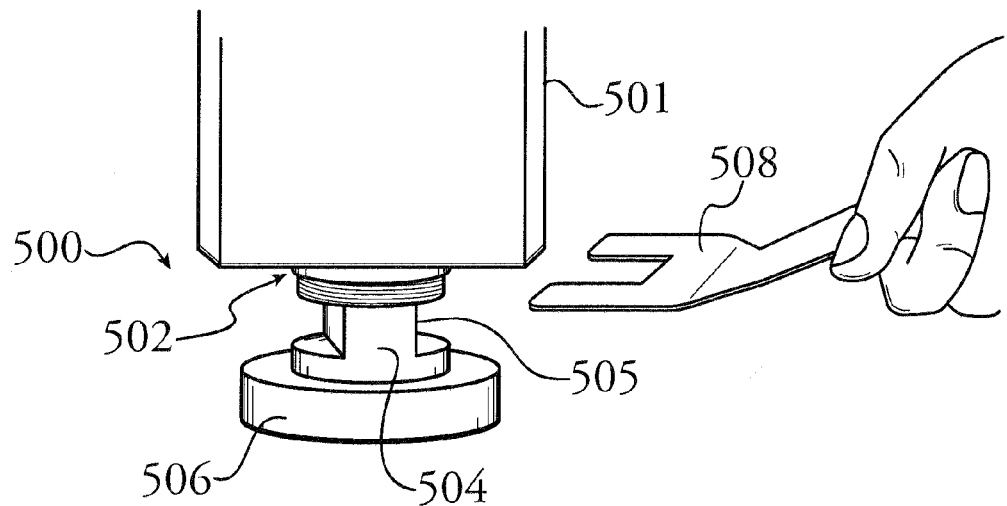

In use, the user turns the screw 504 to raise and lower the leg 501 while monitoring a level on the table top (see FIG. 12).

Figure 14:
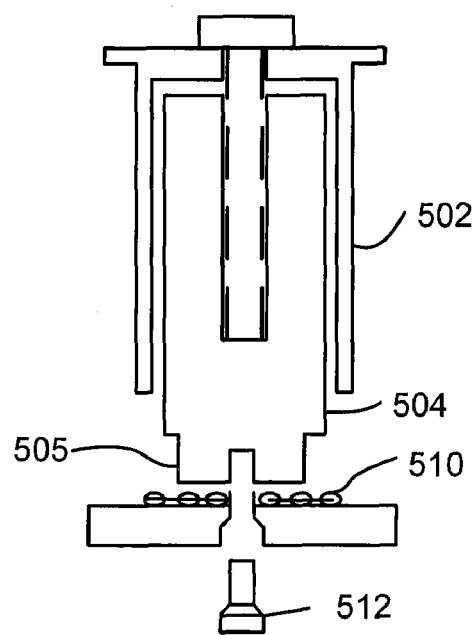
FIG. 14 is a cross sectional view of the table leg shown in FIG. 12.

FIG. 14 is a cross sectional view of the table leg shown in FIG. 12 and includes a roller bearing 510 and a screw 512 to hold the foot pad 506 is place below the screw 504.

Figure 13:
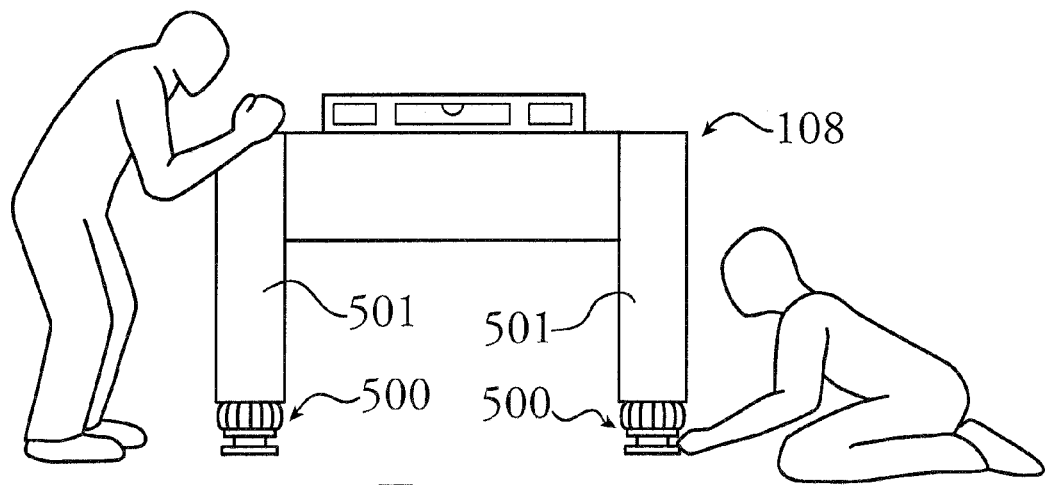
FIG. 13 is a side view of a game table with the table leg leveling apparatus of FIG. 10.
Figure 15:
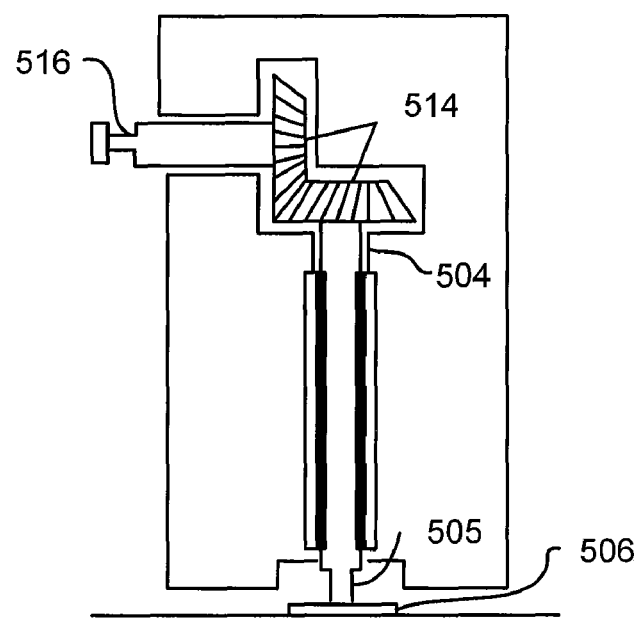
FIG. 15 is a cross sectional view of an alternative embodiment of the leveling apparatus shown in FIG. 13.

FIG. 15 is a cross sectional view of an alternative embodiment of the leveling apparatus shown in FIG. 13 in which a right angle gear assembly 514 permits the pool table to be leveled by turning a shaft 516 protruding from the side of the table frame.

Figure 16:
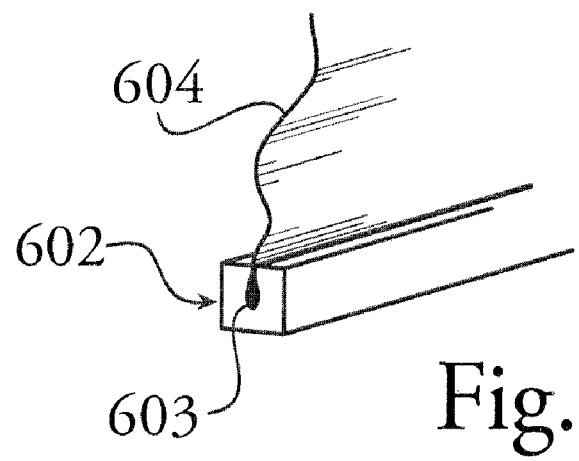
FIGS. 16 and 17 are isometric views of a rail cloth attachment apparatus according to an embodiment of the present invention.
Figure 17:
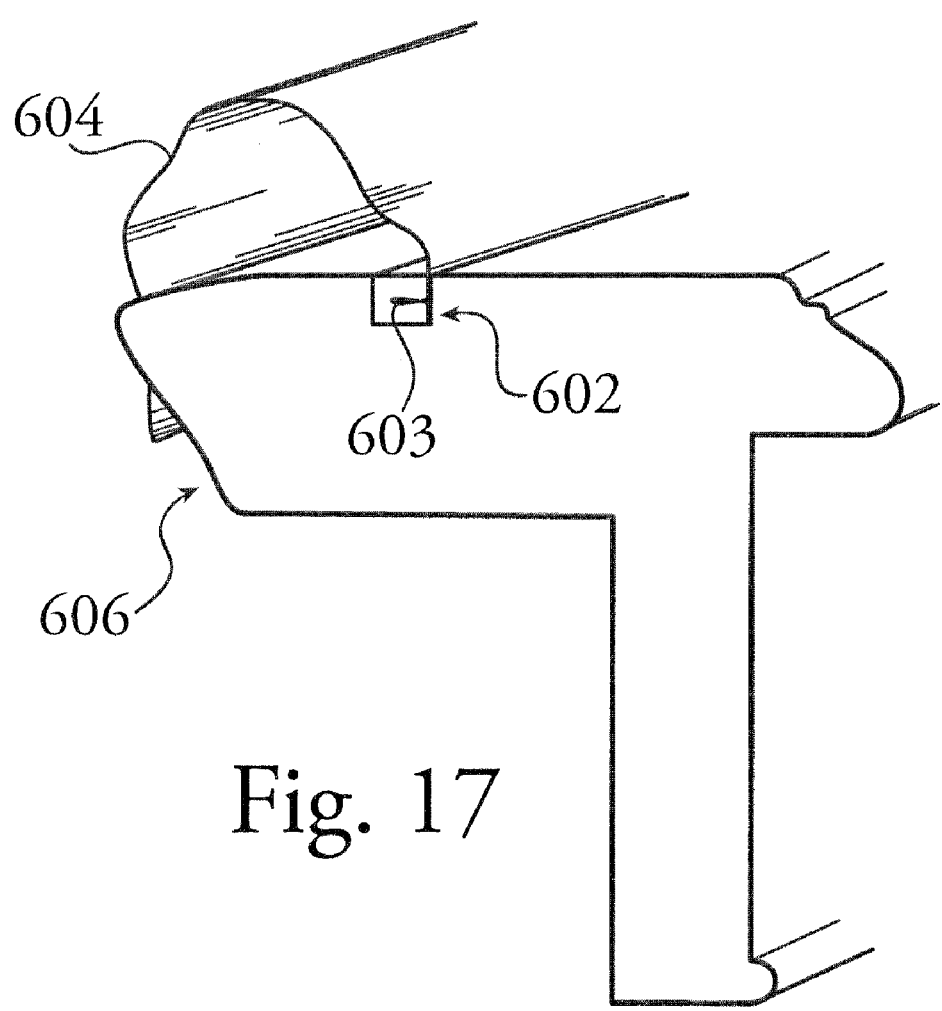

One embodiment of the present invention further includes a rail cloth attachment means similar to the insertable track described in co-pending U.S. patent application Ser. No. 11/747,455, filed on May 11, 2007, the disclosure of which is herein incorporated by reference. The insertable track 602 of an embodiment of the present invention clamps onto a hem 603 on one side of the cloth 604 as shown in FIG. 16. The cloth is inserted into the track 602 by the manufacturer or by a user. The track 602 is sized to snap into a feather stripping groove formed in the top of the rail 606 with the track groove facing away from the center of the table as shown in FIG. 17. The other end of the cloth 604 is then attached to the underside of the rail, such as by a hook and loop fastener. The configuration of the track 602 allows the cloth 604 to completely cover the track and provide a neater finish to the top of the rail.

Figure 18:
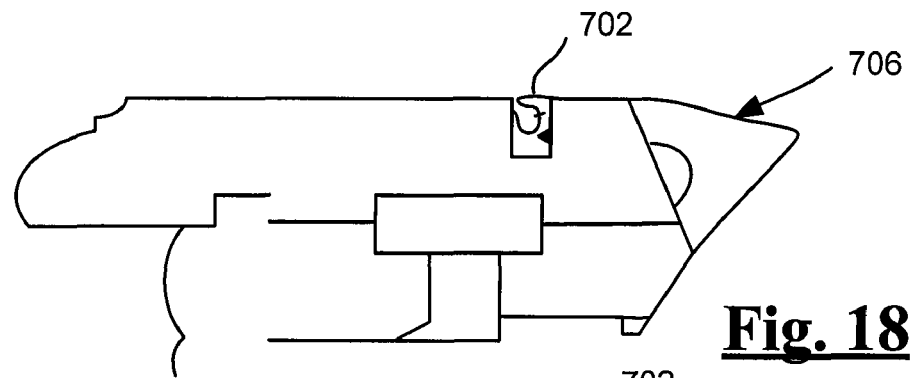
FIGS. 18 and 19 are side views of a rail cloth attachment apparatus according to an embodiment of the present invention.
Figure 19:
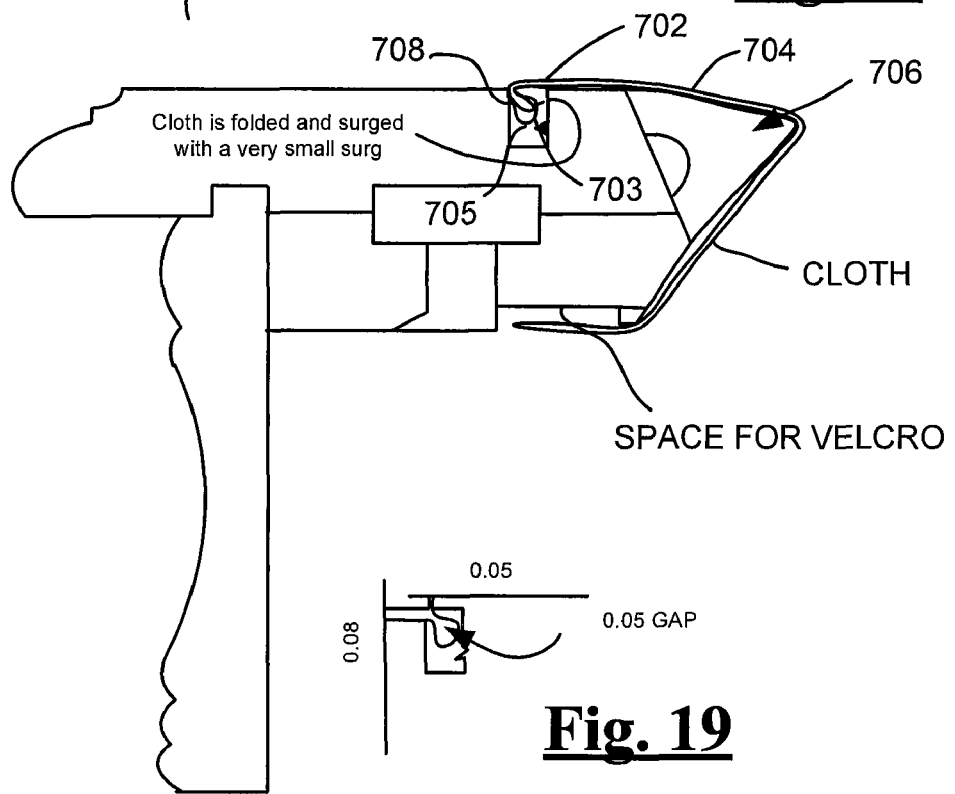

Similarly, the track insert 702 shown in FIGS. 18 and 19 is configured to hide the track insert 702 from view. The end of the cloth 704 is folded at the hem 703 and a small surge is sewn over the fold. This provides a thick portion of the cloth to slide into the track groove 705, which has a small opening 708. The opening 708 accommodates the thinner portion of the cloth while trapping the hem 703 in the groove 705. The track 702 snaps into the feather stripping groove with the opening facing away from the center of the table so the cloth covers the track. Again, the other end of the cloth is affixed to the underside of the rail 706 such as by a hook and loop fastener.

FIG. 20 is a cross sectional view of a slanted side panel 800 with supporting infrastructure. More specifically, the infrastructure includes a top horizontal member 802 which may be medium density fiberboard which is attached to a vertical member 804 which may also be medium density fiberboard. The bottom of the vertical member 804 is connected to the side panel 800 by a lower horizontal member 806 which may be solid wood. A horizontal member 808 extends from the upper left side of the side panel 800 to the left edge of the top horizontal member 802. The various components can be held together by glued dove tails, bolts, etc.

Previously, pool tables have generally used single component wooden supports in frame construction. The single component wooden supports come in a variety of sizes and shapes, but none have been constructed with frame members configured into a multiple component engineered structural beam shape shown in FIG. 20 that maximizes the load carrying capabilities. A pool table is for a game that requires a level playing surface, and the foundation of the playing surface is critical in keeping the surface flat and level Since wooden structural members are subject to movement (wood constantly absorbs and releases moisture) thus causing internal stresses that "move" the wood components over time, by virtue of its natural tendency to expand and contract, it is necessary to find a way to stabilize this movement in a wooden frame. By using an engineered box beam as in FIG. 20, not only the load bearing requirements, but also the deviation created by the movement of moisture in and out of the wooden components of the structural beam is ameliorated. Such a structure has certain configurations that offset internal stresses.

Additionally, wood coatings can be applied to the individual wood members of the structural beam to retard the movement of the moisture moving in and out of the wood. It is a known characteristic of wood to move, warp, or twist by the speed at which moisture leaves the wood member, causing the internal stress forces to act upon the wood and move it. Utilizing structural design, various wood species, and/or coating of the wood provides a more stable table frame.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention.

The invention claimed is:
1. A pool table frame comprising:
   a plurality of box beams defining a rectangular frame, each box beam having
   a slanted side panel with a top and a bottom;
   a top horizontal member with a proximate end on the top of the slanted side panel and a distal end disposed toward the center of the pool table frame;
   a vertical side member extending downward from the distal end of the top horizontal member to a predetermined distance from the bottom of the slanted side panel, the vertical side member being shorter than the slanted side panel; and
   a lower horizontal member extending from the bottom of the vertical member to the slanted side panel, such that a vertical edge of the lower horizontal member abuts a vertical edge of the slanted side panel.
2. The pool table frame of claim 1, wherein the slanted slide panel, the top horizontal member, the vertical side member and the lower horizontal member are joined together to provide a box beam frame.

3. The pool table frame of claim 1 wherein the vertical side member has an upper and a lower end, the upper and the lower end each having a tenon and the horizontal members have corresponding mortises to receive the tenons of the vertical side member.

4. The pool table frame of claim 1 wherein the plurality of box beams comprises two long beams and three short beams wherein
   the long box beams extend the length of the frame, parallel to each other and spaced apart from each other and;
   the three short box beams extend between the long box beams, parallel to each other, including first and second short box beam disposed at respective opposite ends of the long box beams and the third disposed in the middle of the frame.

5. A pool table comprising:
   a plurality of box beams defining a rectangular frame, each box beam having:
      a slanted side panel with a top and a bottom;
      a top horizontal member with a proximate end on the top of the slanted side panel and a distal end disposed toward the center of the frame;
      a vertical side member extending downward from the distal end of the top horizontal member to a predetermined distance from the bottom of the slanted side panel, the vertical side member being shorter than the slanted side panel; and
      a lower horizontal member extending from the bottom of the vertical member to the slanted side panel, such that a vertical edge of the lower horizontal member abuts a vertical edge of the slanted side panel;
   a game surface supported by the rectangular frame;
   a plurality of rails supported by the rectangular frame;
   a plurality of table legs supporting the rectangular frame, each leg having a top and a bottom, each of said plurality of legs defining a through hole extending from the bottom to the top of each of said plurality of legs;
   each leg having a cylindrical, elongated rod having one end proximate the top of the pool table, an elongated external threaded body portion disposed between opposite ends and extending through said through hole, and the other end proximate the bottom of each of said plurality of legs and terminating in a footpad that bears against a floor to support each of said plurality of legs;
   each leg having a hollow cylindrical insert disposed in the through hole, extending the length of the leg and surrounding the rod, said insert fixed to the leg and having an internal thread mated with the elongated external threaded portion of the body of the rod;
   wherein the rods are moveable by rotation with respect to the hollow cylindrical inserts; and
   wherein turning the rods relative to the fixed inserts in one direction lowers the legs with respect to the footpads and turning the rods in the opposite direction raises the legs with respect to the footpads.

6. The pool table as recited in claim 5, wherein each cylindrical, elongated rod of each leg is rotatable about each respective footpad.

7. The pool table as recited claim 6, wherein roller bearings are disposed between each footpad and each footpad's respective leg.

* * * * *